US012465918B2

(12) United States Patent
Yasunaga

(10) Patent No.: US 12,465,918 B2
(45) Date of Patent: Nov. 11, 2025

(54) COVER MEMBER FOR SAMPLE CONTAINER

(71) Applicant: SHIMADZU CORPORATION, Kyoto (JP)

(72) Inventor: Kenichi Yasunaga, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 5 days.

(21) Appl. No.: 18/404,414

(22) Filed: Jan. 4, 2024

(65) Prior Publication Data

US 2024/0261787 A1 Aug. 8, 2024

(30) Foreign Application Priority Data

Feb. 8, 2023 (JP) ................................ 2023-017928

(51) Int. Cl.
*B01L 3/00* (2006.01)

(52) U.S. Cl.
CPC ....... *B01L 3/50825* (2013.01); *B01L 3/50853* (2013.01); *B01L 2300/042* (2013.01); *B01L 2300/044* (2013.01)

(58) Field of Classification Search
CPC ............ B01L 3/50825; B01L 3/50853; B01L 2300/042; B01L 2300/044
USPC .............. 215/247; 220/229, 203.17, 203.18, 220/203.19
See application file for complete search history.

(56) References Cited

U.S. PATENT DOCUMENTS

| | | | | | |
|---|---|---|---|---|---|
| 4,132,334 | A * | 1/1979 | Danks | B65D 47/04 | 222/589 |
| 5,709,309 | A * | 1/1998 | Gallagher | B62D 25/24 | 137/849 |
| 6,419,825 | B1 * | 7/2002 | Hahmann | A61M 1/169 | 604/91 |
| 6,716,396 | B1 * | 4/2004 | Anderson | B01L 3/0275 | 422/570 |
| 7,766,168 | B2 * | 8/2010 | Thrapp | B65F 1/1607 | 206/315.11 |
| 8,016,142 | B2 * | 9/2011 | Renz | A61J 9/04 | 215/11.1 |
| 9,010,589 | B2 * | 4/2015 | Thurman | B65D 47/2037 | 215/253 |

(Continued)

FOREIGN PATENT DOCUMENTS

| | | | | |
|---|---|---|---|---|
| DE | 19544708 A1 * | 6/1997 | B65B 51/142 |
| JP | 2013-036920 A | 2/2013 | |
| WO | WO-2005097323 A1 * | 10/2005 | B01L 3/50853 |

*Primary Examiner* — Orlando E Aviles
*Assistant Examiner* — Niki M Eloshway
(74) *Attorney, Agent, or Firm* — Renner, Otto, Boisselle & Sklar, LLP

(57) ABSTRACT

Provided is a cover member (33, 36, 50) for covering an opening of a sample container in which a liquid sample is to be contained. To accurately collect the liquid sample contained in the sample container while preventing a carryover, the cover member is made of an elastic sheet material and has a slit (331, 361, 511) in an area different from a predetermined area through which a sample-collecting tool for collecting the liquid sample is to be inserted. This cover member can be suitably used as a septum configured to cover an opening of a vial, or as a sheet configured to cover openings of a plurality of wells provided on a microplate.

10 Claims, 6 Drawing Sheets

(56) References Cited

U.S. PATENT DOCUMENTS

| | | | | |
|---|---|---|---|---|
| 2003/0029828 | A1* | 2/2003 | Amschlinger | A61J 1/18 215/247 |
| 2003/0196984 | A1* | 10/2003 | Uchiyama | B65D 47/36 215/355 |
| 2004/0067169 | A1* | 4/2004 | Krause | B65D 51/002 436/180 |
| 2004/0222224 | A1* | 11/2004 | Plester | B67C 7/008 220/203.18 |
| 2005/0103785 | A1* | 5/2005 | Eijkelenberg | B65D 90/36 220/203.18 |
| 2008/0251489 | A1* | 10/2008 | Livingston | B01L 3/50825 215/250 |

* cited by examiner

COVER MEMBER FOR SAMPLE CONTAINER

TECHNICAL FIELD

The present invention relates to a cover member for covering an opening of a sample container, such as a vial or microplate.

BACKGROUND ART

Liquid chromatographs are commonly used for analyzing components contained in liquid samples. In a liquid chromatography components contained in a liquid sample are separated from each other by a column, and the separated components are detected by a detector, such as a spectrophotometer or mass spectrometer. In the case of continuously analyzing a plurality of liquid samples by a liquid chromatograph, an autosampler is used. In the autosampler, a sample rack holding an array of vials, each containing a liquid sample, is set at a predetermined position. Using a sampling needle, the operation of collecting a liquid sample from a vial and injecting it into the injector of the liquid chromatograph is sequentially performed for each vial.

To prevent vaporization of the liquid sample, the opening of the vial containing the liquid sample is often hermetically sealed with a septum. A member made of an elastic material, e.g., polytetrafluoroethylene (PTFE), is used as the septum. When a liquid sample is collected in an autosampler, the sampling needle is driven to penetrate the septum into the vial and be lowered to a position where the tip of the sampling needle is lower than the surface of the liquid sample (i.e., immersed in the liquid sample) to collect a predetermined amount of liquid sample. The sampling needle is subsequently pulled out from the septum and transferred to the injector to introduce the collected liquid sample into the injector.

When a sampling needle is inserted into a vial containing a liquid sample and hermetically sealed by a septum, the pressure within the vial may be increased, which may cause bubbles to be mixed into the liquid sample and cause an error in the amount of collection of the liquid sample. Additionally, when the liquid sample is collected through the sampling needle, a negative pressure may occur within the vial, causing a decrease in the amount of collected liquid sample.

To address this problem, a septum having a linear or cross-shaped slit formed in its central portion through which a sampling needle is to be inserted may be used, as described in Patent Literature 1 for example. Since the inner and outer spaces of the vial can communicate with each other through the slit, there will be no increase or decrease in the pressure within the vial, so that the liquid sample can be accurately collected.

CITATION LIST

Patent Literature

Patent Literature 1: JP 2013-036920 A

SUMMARY OF INVENTION

Technical Problem

As described earlier, when a liquid sample is collected, the tip of the sampling needle is immersed into the liquid sample. Therefore, a certain amount of liquid sample remains on the outer circumferential surface of the sampling needle after the collection of the liquid sample. In the case of the vial having a septum with no slit, the liquid sample adhered to the outer circumferential surface of the sampling needle is wiped off by the septum when the sampling needle is pulled out from the septum. In contrast, in the case where the septum having a slit in its central portion is used, the liquid sample adhered to the outer circumferential surface of the sampling needle cannot be completely wiped off by the septum when the sampling needle is pulled out from the slit; a portion of the liquid sample remains on the outer circumferential surface of the sampling needle. Consequently, when a new liquid sample is collected after the completion of an analysis of one liquid sample, the previously collected liquid sample is mixed into the next liquid sample (i.e., a carryover occurs), causing the measurement result to be incorrect.

The problem to be solved by the present invention is to accurately collect a liquid sample contained in a sample container while preventing a carryover.

Solution to Problem

The present invention developed for solving the previously described problem is a cover member for covering an opening of a sample container in which a liquid sample is to be contained, where the cover member is made of an elastic sheet material and has a slit in an area different from a predetermined area through which a sample-collecting tool for collecting the liquid sample is to be inserted.

Advantageous Effects of Invention

The “predetermined area” is an area through which a sample-collecting tool is expected to be inserted when collecting a liquid sample.

In a sample container on which the cover member according to the present invention has been attached, when a sample-collecting tool is inserted through the predetermined insertion area, the cover member elastically deforms, allowing the inner and outer spaces of the sample container to communicate with each other through the slit provided in the cover member. This prevents an increase in the pressure within the sample container at the time of the insertion of the sample-collecting tool as well as an occurrence of a negative pressure within the sample container during the collection of the liquid sample, so that the liquid sample can be accurately collected. Furthermore, since the slit is located within an area different from the area through which a sample-collecting tool is expected to be inserted, the cover member can completely wipe off the liquid sample adhered to the outer circumferential surface of the sample-collecting tool when this tool is pulled out after the liquid sample has been collected. Accordingly, a carryover can be prevented.

DESCRIPTION OF EMBODIMENTS

Embodiments of the cover member according to the present invention are hereinafter described with reference to the drawings. All drawings used in the following descriptions are model diagrams, with the scale changed from actual values as needed so that the features of each portion will be easily understood.

The first embodiment of the cover member according to the present invention is a septum for covering the opening of a vial containing a liquid sample. A plurality of vials, each containing a liquid sample, are arrayed on a sample rack and set at a predetermined position in an autosampler. The autosampler is connected to an analyzing device, such as a liquid chromatograph. A liquid sample collected by the autosampler is subjected to an analysis in the analyzing device.

Figure 1:
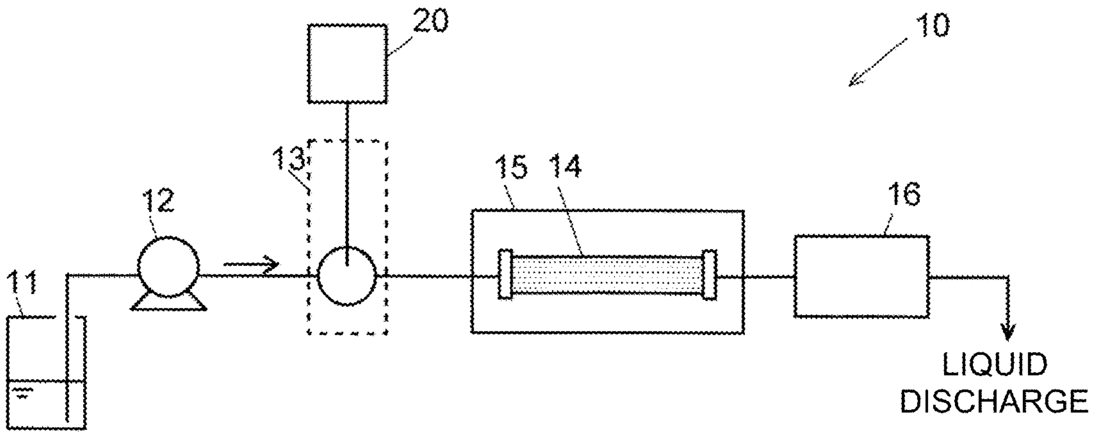
FIG. 1 is a configuration diagram of the main components of a liquid chromatograph, which is an example of an analyzing device for analyzing a liquid sample contained in a vial on which a septum as the first embodiment of the cover member according to the present invention is used.

FIG. 1 is a configuration diagram of the main components of a liquid chromatograph 10. The liquid chromatograph 10 includes: a mobile phase container 11 in which a mobile phase is contained; a liquid supply pump 12 for supplying the mobile phase contained in the mobile phase container 11; an injector 13 configured to introduce a liquid sample into the mobile phase; a column 14 configured to separate compounds in the liquid sample; a column oven 15 configured to constantly maintain the temperature of the column 14; and a detector 16 configured to detect the compounds separated by the column 14. An autosampler 20 is connected to the injector 13.

Figure 2:
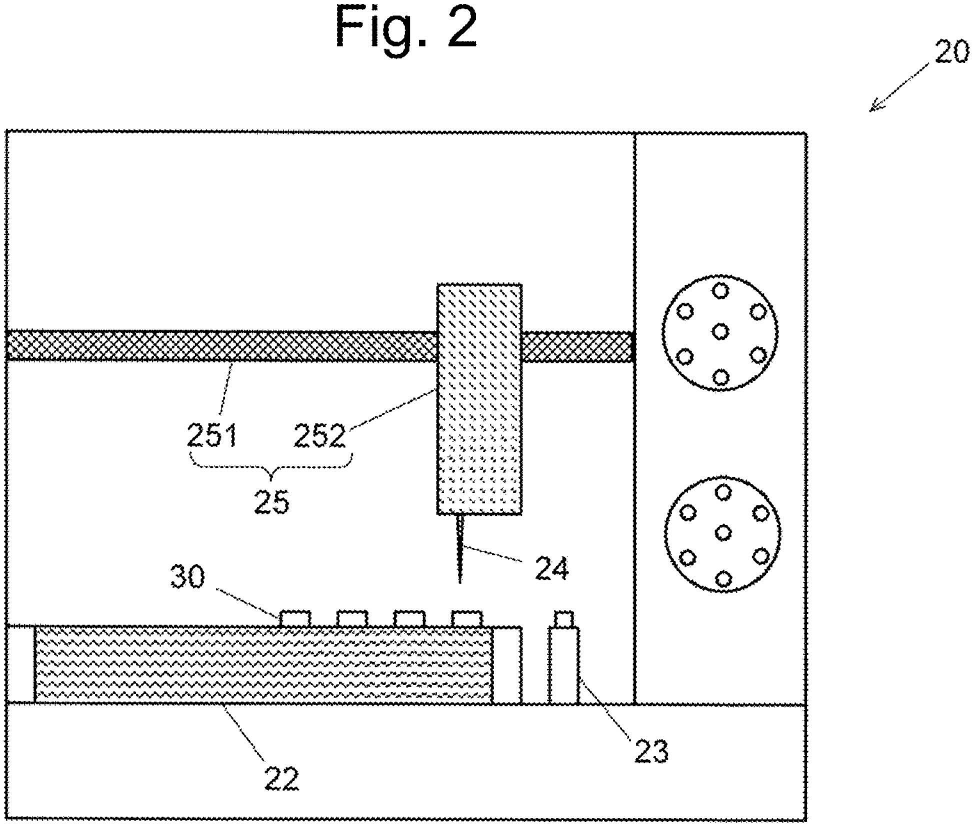
FIG. 2 is a configuration diagram of the main components an autosampler, which is an example of an automatic sample-collecting device for collecting a liquid sample contained in a vial on which the septum according to the first embodiment is used.

FIG. 2 is a configuration diagram of the main components of the autosampler 20. In this autosampler 20, a sample rack 22 is provided, on which a plurality of capped vials 30 (see FIG. 3) are set, with each vial containing a liquid sample and having a cap 32 and a septum 33 attached (as will be described later). An injection port 23, a needle-cleaning port (not shown) and a drain (not shown) are located on one side of the sample rack 22. Located above those elements are a sampling needle 24 and a sampling-needle transfer mechanism 25 for transferring the sampling needle 24 in the horizontal and vertical directions. The sampling-needle transfer mechanism 25 includes a guide rail 251, a moving unit 252 configured to move along the guide rail 251, and a drive source contained in the moving unit 252. The sampling needle 24 is fixed to this moving unit 252. By means of the sampling-needle transfer mechanism 25, the sampling needle 24 is transferred to the position of each capped vial 30 and operated in order to collect the liquid sample contained in the capped vial 30 and introduce it into the injection port 23. The liquid sample introduced into the injection port 23 is injected into the flow of the mobile phase via the injector 13 of the liquid chromatograph 10.

Next, the septum 33 as the first embodiment of the cover member according to the present invention is described.

Figure 3:
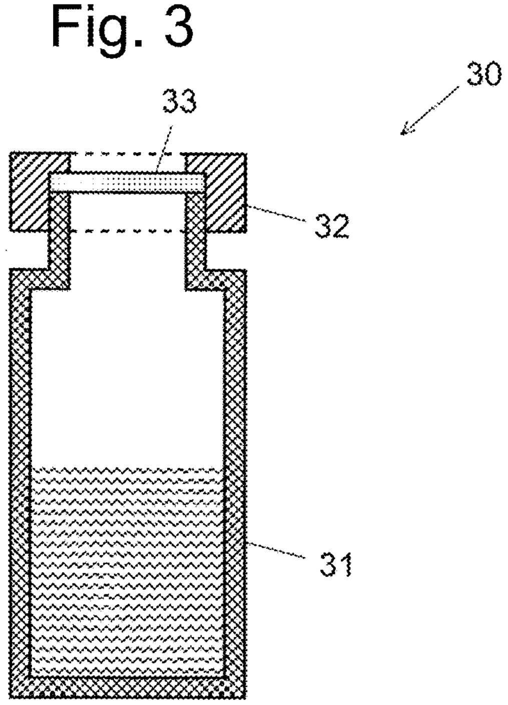
FIG. 3 is a sectional view of the septum according to the first embodiment attached on a vial.

FIG. 3 is a sectional view of a vial 31 containing a liquid sample, with the septum 33 and the cap 32 attached. The septum 33 is attached to the back side of the cap 32. By attaching this cap 32 fitted with the septum 33 on the vial 31, the opening of the vial 31 is covered by the septum 33.

Figure 4:
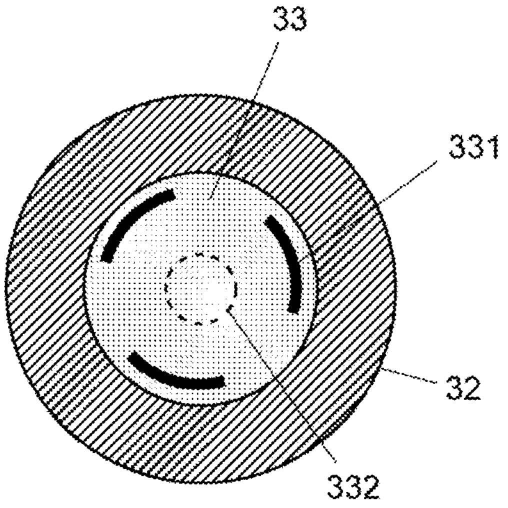
FIG. 4 is a top view of the septum according to the first embodiment attached on a vial.

FIG. 4 is a top view of the septum 33 attached on the vial 31. The cap 32 has a circular opening at its center. When the septum 33 is attached to the back side of the cap 32, the septum 33 is exposed through this opening. The dashed line in FIG. 4 shows an insertion area 332 (which corresponds to the "predetermined area" in the present invention) through which the sampling needle 24 is to be inserted when collecting the liquid sample contained in the vial 31. Three arc-shaped slits 331 are formed in an area further out from the insertion area 322. These three slits 331 are located on a concentric circle having a diameter of 0.85 times the diameter of the opening of the vial 31. These three arcs, each having a central angle of 60 degrees, are arranged in a rotationally symmetrical form with respect to the center of the opening of the vial 31. That is to say, the slits 331 are provided over a total length of one half of the circumference of the concentric circle having a diameter of 0.85 times the diameter of the opening of the vial 31. When there is no sampling needle 24 penetrating the septum 33, the slits 331 are closed, thereby maintaining the inside of the vial 31 in an almost airtight state. Providing the slits 331 on a concentric circle with a diameter of 0.85 times the diameter of the opening of the vial 31 as in the present embodiment is a mere example; the slits 331 should preferably be provided on a concentric circle whose diameter is not smaller than 0.8 times as well as not larger than 0.95 times the diameter of the opening of the vial 31.

The septum 33 in the first embodiment is a disc-shaped sheet object made of an elastic material. For example, polytetrafluoroethylene (PTFE), polypropylene (PP), silicone or similar resin material can be suitably used as the elastic material. A specific example of the septum 33 is an object with the upper portion made of silicone and the lower portion made of PTFE. The septum 33 made of such a material can elastically deform when penetrated by the sampling needle 24 and restore itself to its original form after the sampling needle 24 has been pulled out. Additionally, its sheet-like form facilitates the operation of inserting and pulling out the sampling needle 24.

Figure 5:
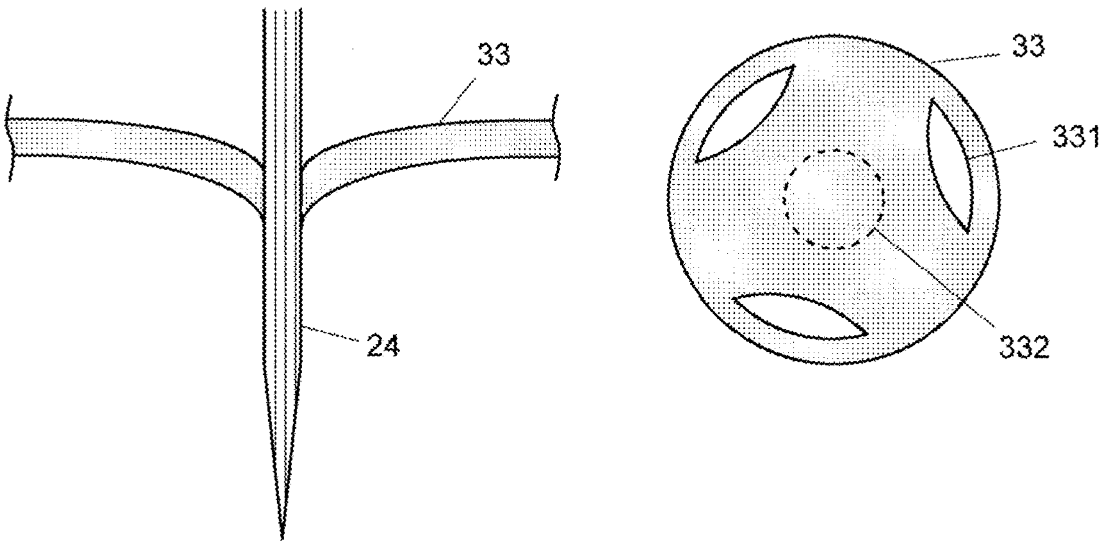
FIG. 5 is a diagram illustrating the state of the septum in the process of inserting a sampling needle into a vial on which the septum according to the first embodiment is attached.

In general, the autosampler 20 is configured so that the sampling needle 24 penetrates the central portion of the septum 33 (the center of the circular portion covering the opening of the vial 31) when collecting the liquid sample contained in the vial 31. When the sampling needle 24 is inserted into the vial 31 on which the septum 33 according to the first embodiment is attached, the central portion of the septum 33 is pulled downward by the force of the needle (FIG. 5, left), causing the entire septum 33 to be deformed, whereby the slits 331 in the septum 33 are opened (FIG. 5, right), allowing the inner and outer spaces of the vial 31 to communicate with each other. This prevents an increase in the pressure within the vial 31 at the time of the insertion of the sampling needle 24 as well as an occurrence of a negative pressure within the vial 31 during the collection of the liquid sample, so that the liquid sample can be accurately collected. When the sampling needle 24 is pulled from the septum 33 after the liquid sample has been collected, the central portion of the septum 33 is pulled upward (FIG. 6), causing the entire septum 33 to be deformed, whereby the slits 331 in the septum 33 are opened, allowing the inner and outer spaces of the vial 31 to communicate with each other.

If large slits 331 are provided in the septum 33, those slits 331 can be sufficiently opened with a small amount of force. On the other hand, too large a slit 331 will open too widely and easily cause a crack from its end portion. With those factors considered, the central angle of each slit 331 should preferably be between 30 and 90 degrees, inclusive. The larger the range over which the slits 331 are provided is, the more satisfactory the vent between the inner and outer spaces of the vial 31 becomes. However, too large a range over which the slits 331 are provided will easily cause a crack in the boundary area between the neighboring slits 331. With those points considered, the total of the central angle of the slits 331 should preferably be between 90 and 270 degrees, inclusive. Furthermore, when being penetrated by the sampling needle 24, the septum 33 should be evenly deformed in order to avoid locally receiving the force. To this end, the slits 331 should preferably be provided in a rotationally symmetrical form with respect to the center of the opening of the vial 31.

Figure 7:
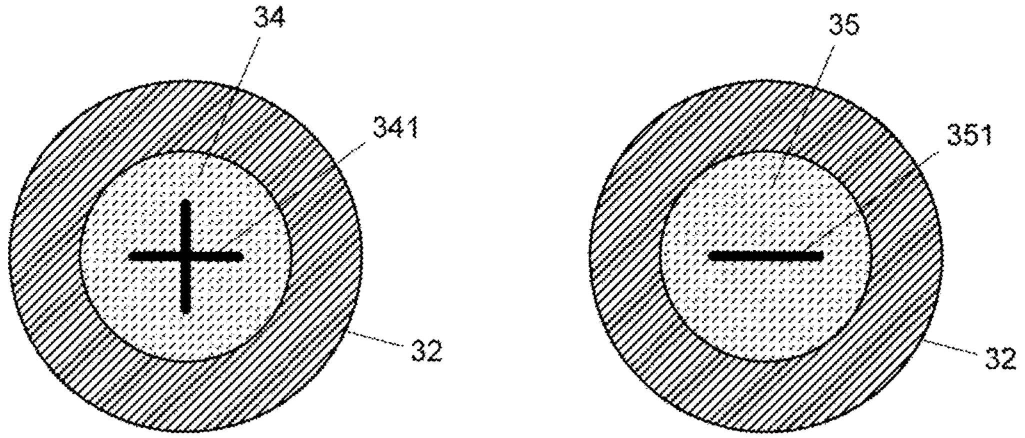
FIG. 7 shows examples of conventionally used septums having a slit.

In order to prevent an increase in the pressure within the vial at the time of the insertion of the sampling needle as well as an occurrence of a negative pressure within the vial during the collection of the liquid sample, septums as shown in FIG. 7 have conventionally been used, in which the septum 34 has a cross-shaped slit 341 at its center, while the septum 35 has a linear slit 351. When any of these septums 34 and 35 is used, the inner and outer spaces of the vial can communicate with each other through the slits 341 or 351. Therefore, there will be no increase or decrease in the pressure within the vial, so that the liquid sample can be accurately collected. However, with these septums 34 and 35, the liquid sample adhered to the outer circumferential surface of the sampling needle cannot be completely wiped off by the septum when the sampling needle is removed; a portion of the liquid sample remains on the outer circumferential surface of the sampling needle. Consequently, in the process of collecting a new liquid sample after the completion of an analysis of one liquid sample, the previously collected liquid sample is mixed into the next liquid sample (i.e., a carryover occurs), causing the measurement result to be incorrect.

Figure 6:
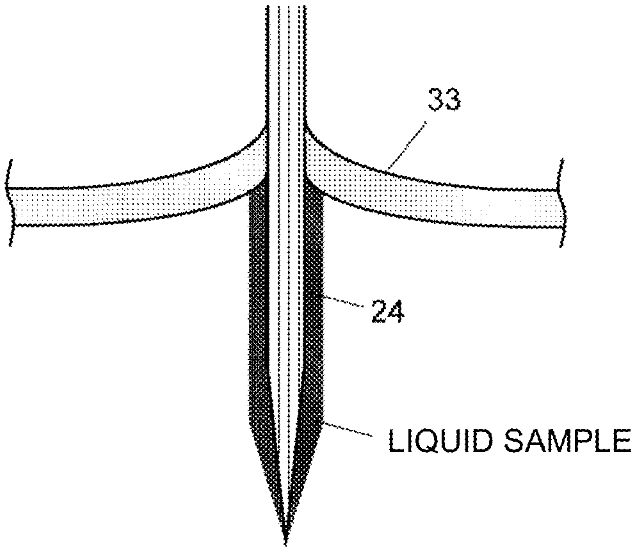
FIG. 6 is a diagram illustrating the state of the septum in the process of pulling out a sampling needle from a vial on which the septum according to the first embodiment is attached.

In contrast, in the case of the septum 33 according to the first embodiment, since the slits 331 are located within an area different from the predetermined insertion area 332 through which the sampling needle 24 is to be inserted, the septum 33 can completely wipe off the liquid sample adhered to the outer circumferential surface of the sampling needle 24 when the sampling needle 24 is removed after the liquid sample has been collected, as shown in FIG. 6. Thus, a carryover can be prevented.

In general, the autosampler 20 is designed that the sampling needle 24 penetrates the central portion 33 of the septum 33 when collecting the liquid sample contained in the vial 31. Since the autosampler 20 is configured to mechanically change the position of the sampling needle 24 by a previously determined length, there is only a small variation in the position at which the sampling needle 24 penetrates the septum 33. Accordingly, for a septum 33 which is designed to be attached to cover the opening of a vial 31 to be set in the autosampler 20, for example, a circle which is concentric with the opening of the vial 31 and has a diameter not smaller than the outer diameter of the sampling needle 24 as well as not larger than three times the outer diameter of the sampling needle 24 can be defined as the predetermined insertion area 332, and the slits 331 can be provided further out from this area. Furthermore, in normal cases, since the sampling needle 24 penetrates the center of the opening, the insertion area 332 should preferably be an area including the center of the septum 33.

In normal cases, the autosampler 20 is used to collect the liquid sample. However, it is also possible that an analysis operator manually collects the liquid sample from the vial 31 with a syringe or similar tool. In that case, it is preferable to define a wider range as the aforementioned range. As a specific example, a circle which is concentric with the opening of the vial 31 and has an appropriate diameter not larger than 0.5 times the diameter of the opening can be defined as the predetermined insertion area 332, and the slits 331 can be provided further out from this area. For example, when a circle which is concentric with the opening and has a diameter of 0.5 times the diameter of the opening is defined as the predetermined insertion area 332, with the slits 331 provided further out from this area, the septum 33 can be used for both the automatic collection of the liquid sample with the autosampler 20 and the manual collection of the liquid sample by an analysis operator. The septum 33 according to the first embodiment can be suitably used for both cases since its slits 331 are located on a circle which is concentric with the opening of the vial 31 and has a diameter of 0.85 times the diameter of the opening.

When the sampling needle 24 penetrates the central portion of the septum 33, a certain amount of force acts on the septum 33 in the radial direction of the opening. In the septum 33 according to the first embodiment, since the slits 331 have an arc shape orthogonal to the radial direction of the opening, the slits 331 can be easily opened, so that the communication between the inner and outer spaces of the vial 31 can be easily achieved.

Figure 8:
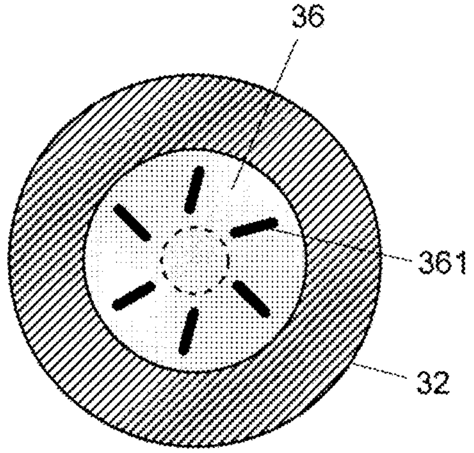
FIG. 8 is a top view of a septum according to a modified example attached on a vial.

However, the shape of the slits 331 is not limited to the arc shape as in the previous example; the shape may be appropriately changed according to various conditions, such as the material of the septum 33 or the size of the opening. Since the force which acts on the opening during the penetration of the sampling needle 24 or syringe through the central portion of the septum 33 is in the radial direction, the minimum requirement for the slits to be capable of opening upon insertion of the sampling needle 24 (or the like) is that each slit should be formed in a direction intersecting with the radial direction of the opening. For example, in the case of a septum 36 made of an easily deformable material, it is possible to form slits 361 as shown in FIG. 8, considering the fact that repeating the penetration of the sampling needle 24 through the septum 33 shown in FIG. 4 can gradually cause the slits 331 to be split at their ends, making the septum 33 easy to be torn. The slits 361 in FIG. 8 are less likely to be split since they extend in a direction close to the radial direction of the opening in which the force acts during the penetration of the sampling needle 24 or similar tool (in FIG. 8, the slits 361 extend in a direction tilted to the radial direction of the opening by 15 degrees).

Next, a sheet which is the second embodiment of the cover member according to the present invention is described.

Figure 9:
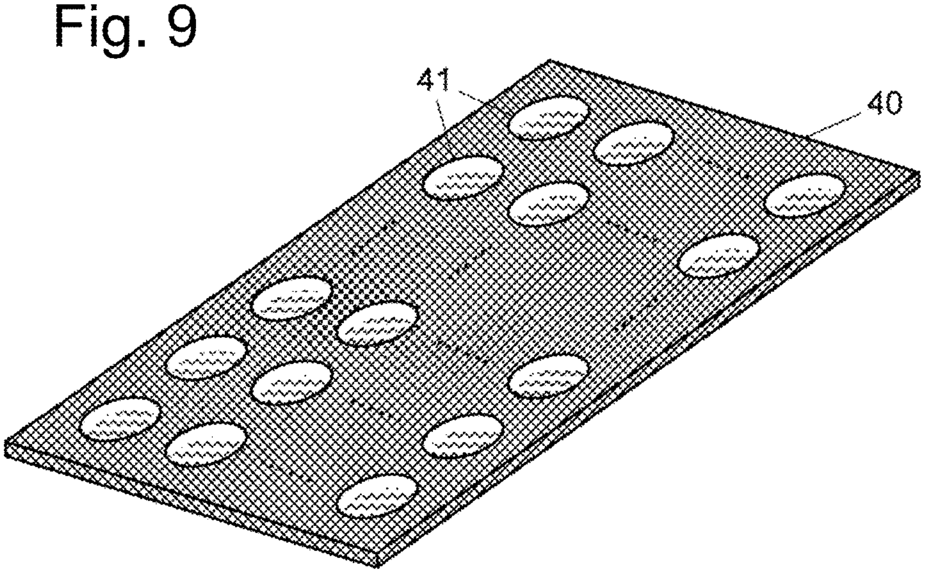
FIG. 9 is a diagram showing the structure of a microplate on which a sheet as the second embodiment of the cover member according to the present invention is to be used.

The sheet 50 according to the second embodiment is used for covering a microplate 40 designed to hold many liquid samples, as shown in FIG. 9. The microplate 40 has a specific number (e.g., 96) of wells 41 arranged in a lattice pattern (12×8). Each of those wells 41 is a small recess designed to hold a liquid sample. The microplate 40, with each well 41 containing a liquid sample, is also set at a predetermined position in the autosampler, in which the liquid samples are collected from the individual wells by a predetermined procedure.

Figure 10:
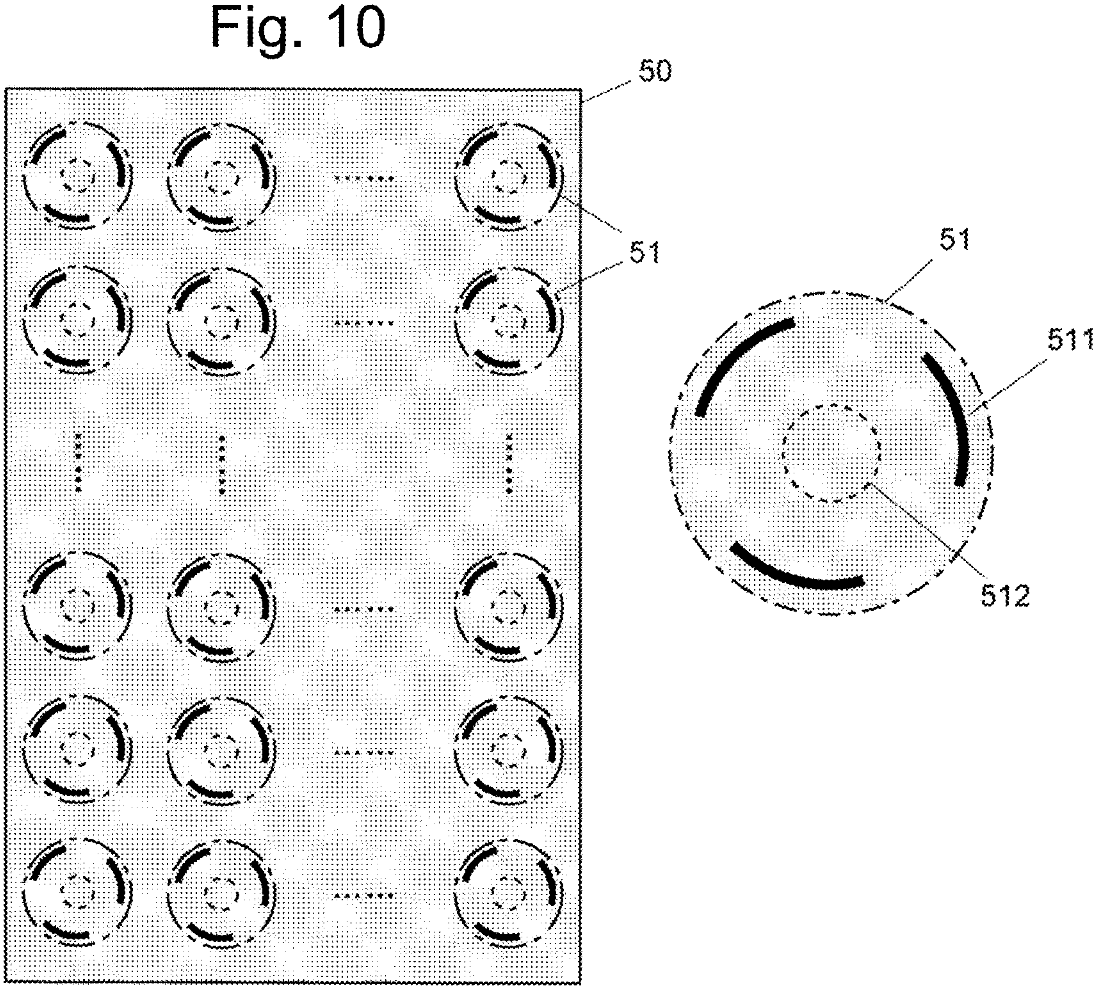
FIG. 10 is a plan view of the sheet according to the second embodiment.
Figure 11:
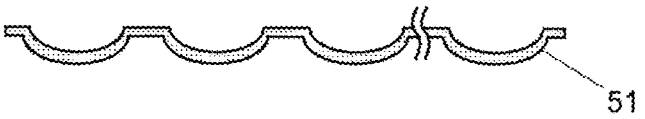
FIG. 11 is a sectional view of the sheet according to the second embodiment.
Figure 12:
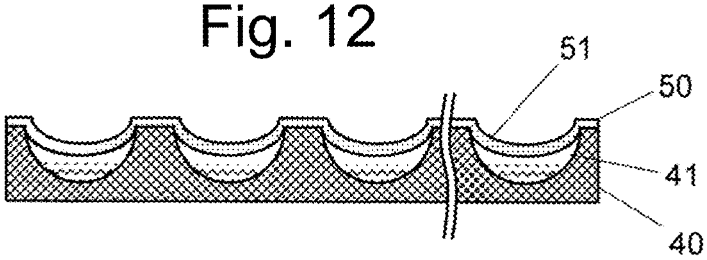
FIG. 12 is a sectional view of the sheet according to the second embodiment attached to a microplate.

FIG. 10 is a plan view of the sheet 50, while FIG. 11 is a sectional view of the same sheet 50. FIG. 12 is a sectional view of the sheet 50 attached to the microplate 40. The sheet 50 has well-covering portions 51 at positions corresponding to the wells 41 of the microplate 40, with each well-covering portion 51 shaped like a dome with a diameter approximately equal to that of the well 41. When the sheet 50 is in use, the sheet 50 is fixed to the upper surface of the microplate 40, as shown in the sectional view in FIG. 12, by fitting the well-covering portions 51, with the dome-shaped portions directed downward, into the corresponding wells 41 of the microplate 40.

As shown in an enlarged view on the right side of FIG. 10, the slits 511 are formed in each well-covering portion 51 in the sheet 50 as the second embodiment. As in FIG. 4, each dashed line in FIG. 10 shows an insertion area 512 (which corresponds to the "predetermined area" in the present invention) which the sampling needle penetrates when collecting a liquid sample contained in the well 41. In each well-covering portion 51, three arc-shaped slits 511 are formed in an area further out from the insertion area 512. Those three slits 511 are located on a circle which is concentric with the opening of each well 41 and has a diameter of 0.85 times the diameter of the opening (indicated by the long-dashed short-dashed line in FIG. 10). These three arcs, each having a central angle of 60 degrees, are arranged in a rotationally symmetrical form with respect to the center of the opening of the well 41. Once again, providing the slits 511 on a concentric circle with a diameter of 0.85 times the diameter of the opening of the well 41 as in the present embodiment is a mere example; the slits 511 should preferably be provided on a concentric circle whose diameter is not smaller than 0.8 times as well as not larger than 0.95 times the diameter of the opening of the well 41.

Like the septum 33 according to the first embodiment, the sheet 50 according to the second embodiment is also made of an elastic material. For example, silicone or similar resin materials can be suitably used as the elastic material. A sheet 50 made of this type of material can elastically deform when penetrated by the sampling needle and restore itself to its original form after the sampling needle has been pulled out.

In the sheet 50 according to the second embodiment, when a sampling needle is inserted into the well-covering portion 51, the central portion of the well-covering portion 51 is pulled downward by the force of the needle, causing the entire well-covering portion 51 to be deformed, whereby the slits 511 formed in the well-covering portion 51 are opened, allowing the inner and outer spaces of the well 41 to communicate with each other. When the sampling needle is pulled out from the well-covering portion 51 after the liquid sample has been collected, the central portion of the well-covering portion 51 is pulled upward, causing the entire well-covering portion 51 to be deformed, whereby the slits 511 are opened, allowing the inner and outer spaces of the well 41 to communicate with each other. This prevents an increase in the pressure within the well 41 as well as an occurrence of a negative pressure within the well 41 during the collection of the liquid sample, so that the liquid sample can be accurately collected.

Furthermore, since the slits 511 are located within an area different from the predetermined insertion area 512 through which the sampling needle 24 is to be inserted, the well-covering portion 51 can completely wipe off the liquid sample adhered to the outer circumferential surface of the sampling needle when the sampling needle is pulled out from the well-covering portion 51 after the liquid sample has been collected, similar to FIG. 6. Thus, a carryover can be prevented.

The sheet 50 according to the second embodiment also allows the position and/or shape of the slits 511 to be appropriately changed in a similar manner as described concerning the septum 33 according to the first embodiment.

The previously described embodiments are mere examples and can be appropriately changed or modified without departing from the spirit of the present invention.

In both the septum 33 according to the first embodiment and the sheet 50 according to the second embodiment, the predetermined insertion area 332 or 512 is provided at a central portion of the opening of the vial 31 or well 41 on the assumption that a sampling needle or similar sample-collecting tool will be inserted into that central portion. In the case of a septum or sheet to be used in a device designed to insert the sample-collecting tool into an area different from the central portion of the vial 31 or well 41, the predetermined insertion area 332 or 512 can be provided in a position corresponding to that area, with the slits 331 or 511 formed in the other area.

The previous descriptions of the septum 33 according to the first embodiment and the sheet 50 according to the second embodiment were concerned with the case where the vial 31 or well 41 had a circular opening. Their openings may have a non-circular shape, in which case the position and/or shape of the slits can be appropriately changed according to the shape of the opening. As opposed to the first embodiment in which the septum 33 was designed to be attached to the cap 32, the septum 33 may also be designed to cover the opening of the vial 31 by being directly attached to the vial 31 without the cap 32.

The sheet 50 according to the second embodiment was provided with dome-shaped well-covering portions 51 located at positions corresponding to the plurality of wells 41 of the microplate 40. Alternatively, a flat sheet may be used. In that case, virtual areas corresponding to the openings of the plurality of wells 41 can be defined on the sheet, with slits 511 like the previously described ones formed in each virtual area. This sheet can be fixed to the upper surface of the microplate 40 by an appropriate method, e.g., by applying an adhesive to the four corners of the sheet.

Although the previous descriptions of the embodiments were concerned with the case of using a liquid chromatograph 10 or autosampler 20, the use of those devices is optional.

[Modes]

It is evident for a person skilled in the art that the previously described illustrative embodiments are specific examples of the following modes of the present invention.

(Clause 1)

One mode of the present invention is a cover member for covering an opening of a sample container in which a liquid sample is to be contained, where the cover member is made of an elastic sheet material and has a slit in an area different from a predetermined area through which a sample-collecting tool for collecting the liquid sample is to be inserted.

The "predetermined area" is an area through which a sample-collecting tool is expected to be inserted when collecting a liquid sample.

In a sample container on which the cover member according to Clause 1 has been attached, when a sample-collecting tool is inserted through the predetermined insertion area, the inner and outer spaces of the sample container are allowed to communicate with each other through the slit. This prevents an increase in the pressure within the sample container as well as an occurrence of a negative pressure within the sample container during the collection of the liquid sample, so that the liquid sample can be accurately collected. Furthermore, since the slit is located within an area different from the area through which a sample-collecting tool is expected to be inserted, the cover member can completely wipe off the liquid sample adhered to the outer circumferential surface of the sample-collecting tool when this tool is pulled out after the liquid sample has been collected, whereby a carryover can be prevented.

(Clause 2)

In the cover member according to Clause 2, which is one mode of the cover member according to Clause 1, the opening has a circular shape, and the slit is located further out from a circle which is concentric with the opening, the circle having a diameter of 0.5 times the diameter of the opening.

In the case of mechanically transferring a sample-collecting tool as in an autosampler, there is only a small variation in the position at which the sample-collecting tool is inserted. By comparison, in the case where an analysis operator manually operates a sample-collecting tool to collect a liquid sample, a variation in the position of the insertion of the sample-collecting tool may occur if the analysis operator is not a skilled individual. In the cover member according to Clause 2, the slit is located further out from a concentric circle having a diameter of 0.5 times the diameter of the opening of the sample container, thereby forming a large area through which the sample-collecting tool can be inserted. Accordingly, the cover member can be suitably used even in the case where an analysis operator who is not a skilled individual manually collects liquid samples.

(Clause 3)

The cover member according to Clause 3 is one mode of the cover member according to Clause 2 and includes one or more arc-shaped slits each of which is configured as the aforementioned slit, with each arc-shaped slit having a central angle between 30 degrees and 90 degrees, inclusive.

When a sample-collecting tool is inserted into a central portion of the opening, the cover member is stretched toward that central portion and deformed in its entirety. In the cover member according to Clause 3, since each slit has an are shape with a central angle between 30 degrees and 90 degrees, inclusive, the arc-shaped slits can be easily opened when stretched toward the central portion of the cover member, allowing the inner and outer spaces of the sample container to communicate with each other.

(Clause 4)

In the cover member according to Clause 4, which is one mode of the cover member according to Clause 3, the total of the central angle of the one or more arc-shaped slits is between 90 degrees and 270 degrees, inclusive.

In the cover member according to Clause 4, the vent between the inner and outer spaces of the sample container can be satisfactory since the total of the central angle of the one or more arc-shaped slits is not smaller than 90 degrees. Furthermore, an occurrence of a crack in the boundary area between the neighboring slits can be prevented since the total of the central angle of the one or more arc-shaped slits is not larger than 270 degrees.

(Clause 5)

In the cover member according to Clause 5, which is one mode of the cover member according to one of Clauses 2-4, a plurality of slits each of which is configured as the aforementioned slit are provided in a rotationally symmetrical form with respect to the center of the opening.

Inserting a sample-collecting tool through a central portion of the cover member causes tensile force stretching the entire cover member toward the central portion. In the cover member according to Clause 5, since a plurality of slits each of which is configured as the aforementioned slit are provided in a rotationally symmetrical form with respect to the center of the opening, the cover member will be evenly deformed when the tensile force toward the central portion acts on it. This prevents the force from acting on a local area and causing damage to the cover member.

(Clause 6)

A septum according to Clause 6, which is one mode of the cover member according to one of Clauses 1-5, is configured to cover the opening of a vial which is the sample container.

(Clause 7)

In the septum according to Clause 7, which is one mode of the septum according to Clause 6, the portion for covering the opening of the vial has a circular shape, and the predetermined area is an area including the center of the circular shape.

(Clause 8)

A sheet according to Clause 8, which is one mode of the cover member according to one of Clauses 1-5, is configured to cover openings of a plurality of wells of a microplate which is the sample container.

(Clause 9)

In the sheet according to Clause 9, which is one mode of the sheet according to Clause 8, well-covering portions are formed at positions corresponding to the plurality of wells, with each well-covering portion configured to cover the corresponding well.

(Clause 10)

The sheet according to Clause 10, which is one mode of the sheet according to Clause 9, the well-covering portions have a circular shape, and the predetermined area is provided for each of the well-covering portions, with each predetermined area being an area including the center of the corresponding well-covering portion.

The cover member according to any one of Clauses 1-5 can be suitably used as a septum for covering the opening of a vial, as described in Clauses 6 and 7, or as a sheet for covering the openings of a plurality of wells provided on a microplate, as described in Clauses 8 through 10. When used as a septum, the portion for covering the opening of the vial often has a circular shape, as described in Clause 7, in which case an area including the center of the circular shape may preferably be designated as the predetermined area. When used as a sheet for covering the openings of a plurality of wells, it is preferable to form a well-covering portion for each well at a position corresponding to that well, as described in Clause 9, as well as to give a circular shape to the well-covering portion and define an area including the center of the well-covering portion as the predetermined area, as described in Clause 10.

REFERENCE SIGNS LIST

10 . . . Liquid Chromatograph
20 . . . Autosampler

30 . . . Capped Vial
31 . . . Vial
32 . . . Cap
33, 36 . . . Septum
331, 361 . . . Slit
332 . . . Insertion Area
40 . . . Microplate
41 . . . Well
50 . . . Sheet
51 . . . Well-Covering Portion
511 . . . Slit
512 . . . Insertion Area

The invention claimed is:

1. A cover member for covering an opening of a sample container in which a liquid sample is to be contained, wherein the cover member is made of an elastic sheet material and has:

a predetermined area through which a sample-collecting tool penetrates when collecting the liquid sample, and slits located in a different area of the elastic sheet material from the predetermined area, wherein;

the elastic sheet material extends between the slits and between the predetermined area and the slits, such that:

the elastic sheet material deforms the slits when the collecting tool penetrates the predetermined area; and the deformation of the slits acts as pressure for the sample container.

2. The cover member according to claim 1, wherein the opening has a circular shape, and the slits are located further out from a circle which is concentric with the opening, the circle having a diameter of 0.5 times a diameter of the opening.

3. The cover member according to claim 2, wherein the slits include one or more arc-shaped slits with each arc-shaped slit having a central angle between 30 degrees and 90 degrees, inclusive.

4. The cover member according to claim 3, wherein a total of the central angles of each of the one or more arc-shaped slits is combined between 90 degrees and 270 degrees, inclusive.

5. The cover member according to claim 2, wherein the slits are provided in a rotationally symmetrical form with respect to the center of the opening.

6. A septum configured as the cover member according to claim 1, wherein the septum is configured to cover an opening of a vial which is the sample container.

7. The septum according to claim 6, wherein:

a portion of the septum for covering the opening of the vial has a circular shape; and the predetermined area is an area including a center of the circular shape.

8. A sheet configured as a cover member according to claim 1, wherein the sheet is configured to cover openings of a plurality of wells of a microplate which is the sample container.

9. The sheet according to claim 8, wherein well-covering portions are formed at positions corresponding to the plurality of wells, with each well-covering portion configured to cover a corresponding well.

10. The sheet according to claim 9, wherein:

the well-covering portions have a circular shape; and the predetermined area is provided for each of the well-covering portions, with each predetermined area being an area including a center of the corresponding well-covering portion.

* * * * *